(12) United States Patent
Toro Estrella

(10) Patent No.: US 12,544,176 B2
(45) Date of Patent: Feb. 10, 2026

(54) SYSTEMS, DEVICES AND METHODS FOR ASPIRATING FLUIDS THAT COLLECT AROUND TISSUE EXPANDERS THAT ARE IMPLANTED IN BREAST TISSUE

(71) Applicant: Mentor Worldwide LLC, Irvine, CA (US)

(72) Inventor: Hector Javier Toro Estrella, Lake Forest, CA (US)

(73) Assignee: Mentor Worldwide LLC, Irvine, CA (US)

( * ) Notice: Subject to any disclaimer, the term of this patent is extended or adjusted under 35 U.S.C. 154(b) by 265 days.

(21) Appl. No.: 18/129,143

(22) Filed: Mar. 31, 2023

(65) Prior Publication Data
US 2023/0329823 A1    Oct. 19, 2023

Related U.S. Application Data

(60) Provisional application No. 63/331,394, filed on Apr. 15, 2022.

(51) Int. Cl.
*A61B 90/00* (2016.01)
*A61B 17/34* (2006.01)
(Continued)

(52) U.S. Cl.
CPC .......... *A61B 90/02* (2016.02); *A61B 17/3421* (2013.01); *A61B 2017/00876* (2013.01); *A61B 2217/005* (2013.01); *A61M 1/815* (2021.05)

(58) Field of Classification Search
CPC .......... A61B 2217/005; A61B 17/3421; A61B 90/02; A61B 2017/00876;
(Continued)

(56) References Cited

U.S. PATENT DOCUMENTS

| 4,413,993 A * | 11/1983 | Guttman | A61M 5/32 604/274 |
| 11,185,384 B2 | 11/2021 | Feinberg et al. | |

(Continued)

FOREIGN PATENT DOCUMENTS

| WO | 2008061043 A2 | 5/2008 |
| WO | 2020149993 A1 | 7/2020 |

OTHER PUBLICATIONS

International Search Report issued in International Patent Application No. PCT/IB2023/051952 dated May 30, 2023.
(Continued)

*Primary Examiner* — Susan S Su
(74) *Attorney, Agent, or Firm* — TROUTMAN PEPPER LOCKE LLP

(57) ABSTRACT

A method of removing fluid from breast tissue surrounding a tissue expander includes identifying a location of an injection port of a tissue expander, and obtaining a needle including a needle shaft defining a lumen, the needle including a closed tip at the distal end of the needle shaft and at least one lateral opening formed in an outer wall of the needle shaft that is in fluid communication with the lumen. The method includes inserting the closed tip of the needle through skin of the patient, the breast tissue, and the injection port until the closed tip of the needle contacts a needle guard, visually confirming that the at least one lateral opening of the needle is not located outside of the patient's skin, and aspirating fluid from the breast tissue via the at least one lateral opening of the needle.

20 Claims, 8 Drawing Sheets

(51) Int. Cl.
    *A61M 1/00* (2006.01)
    *A61B 17/00* (2006.01)
(58) Field of Classification Search
    CPC .. A61B 2090/3908; A61B 2017/00792; A61B 2017/00796; A61B 2090/3937; A61B 2090/3954; A61M 1/815; A61M 1/67; A61M 39/0208; A61M 2039/0205; A61M 2039/0226; A61M 2205/04; A61M 2210/1007; A61M 5/3291; A61M 1/89; A61F 2/12; A61F 2210/009; A61F 2250/0003; A61F 2250/0067; A61F 2250/0096
    See application file for complete search history.

(56) References Cited

U.S. PATENT DOCUMENTS

| | | |
|---|---|---|
| 11,191,635 B2 | 12/2021 | Martin et al. |
| 2008/0294096 A1 | 11/2008 | Uber, III et al. |
| 2020/0012925 A1 | 1/2020 | Kim et al. |
| 2020/0129258 A1* | 4/2020 | Feinberg ................ A61M 1/60 |
| 2020/0129259 A1 | 4/2020 | Feinberg |

OTHER PUBLICATIONS

Written Opinion of the International Searching Authority issued in International Patent Application No. PCT/IB2023/051952 dated May 30, 2023.

* cited by examiner

SYSTEMS, DEVICES AND METHODS FOR ASPIRATING FLUIDS THAT COLLECT AROUND TISSUE EXPANDERS THAT ARE IMPLANTED IN BREAST TISSUE

CROSS REFERENCE TO RELATED APPLICATION

The present application claims benefit of priority to U.S. Provisional Patent Application No. 63/331,394 filed Apr. 15, 2022. The entire contents of which are hereby incorporated by reference.

BACKGROUND OF THE INVENTION

Field of the Invention

The present patent application is generally related to prosthetic implants, and is more particularly related to tissue expanders that are implanted in breast pockets of breast tissue for breast reconstruction.

Description of the Related Art

Tissue expanders are medical devices that are implanted beneath the skin or muscle and then gradually inflated to stretch the overlying tissue. Expanders are commonly used to either create a pocket for receiving a permanent prosthesis, or to generate an increased skin surface area in anticipation of the new skin being utilized for grafting or reconstruction.

Tissue expanders are typically formed of a silicone polymer shell. After implantation, a fluid, such as saline, is periodically injected into the tissue expander to enlarge it over time. Between injections, the surrounding skin is permitted to stretch and grow to create the increased skin surface and the increased tissue pocket for receipt of a permanent implant. Typically, a tissue expander has an injection element through which fluid can be introduced into or withdrawn from the expander. One type of injection element is an integrated injection port having a septum that can be pierced with a hypodermic needle for introducing or withdrawing fluid from the tissue expander. Alternatively, the injection element may be a self-sealing area provided on the tissue expander, which allows penetration by a hypodermic needle and self-closing after the needle has been withdrawn from the injection element of the tissue expander.

After surgery, patients typically have surgical drains placed to prevent blood and lymphatic fluid from building up under the skin, allowing for a quicker recovery. Some patients are sent home with drains that are implanted and connected to an external reservoir. Emptying these reservoirs can be traumatic because the patients have to measure and empty the reservoirs periodically (e.g., every morning). Many patients loathe surgical drains and look forward to having the drains removed.

Most commercially available tissue expanders have a single port that is used for inflating and deflating the shell of the tissue expander. These convention tissue expanders provide no means, however, for draining fluid (e.g., seroma) that forms around the outside of the shell of the tissue expander after the tissue expander has been implanted into the breast tissue of a patient.

There have been some advances related to integrating fluid drainage capabilities into tissue expanders. For example, U.S. Pat. No. 11,185,384, assigned to Mentor Worldwide LLC, the disclosure of which is hereby incorporated by reference herein, teaches a tissue expander having an integrated drain with an outer shell having an opening and one or more drainage holes. An injection port is disposed in the opening of the outer shell and forms a fluid-tight seal with the outer shell. The injection port includes a needle guard having a needle guard base with a top surface, and a barrier membrane that overlies the top surface of the needle guard base. The barrier membrane defines an inflation chamber located between the top surface of the needle guard base and a bottom surface of the barrier membrane, and a drainage chamber overlying a top surface of the barrier membrane. The tissue expander includes one or more inflation ports that are in fluid communication with the inflation chamber for inflating and deflating the outer shell with a first fluid. A drainage conduit is in fluid communication with and extends between the drainage chamber and the one or more drainage holes for draining a second fluid that may accumulate around the outside the shell.

In addition, US 2020/0129259, assigned to Mentor Worldwide LLC, the disclosure of which is hereby incorporated by reference herein, teaches a tissue expander having an integrated drain. The tissue expander has a shell with an opening and one or more drainage holes, and an injection port disposed in the opening of the shell and forming a fluid-tight seal with the shell. The tissue expander has a drainage conduit incorporated therein that is in fluid communication with one or more drainage holes formed in the shell for draining a second fluid that may accumulate around the outside the shell.

In spite of the above advances, there remains a need for improved systems, devices, and methods for enabling surgeons to drain and/or aspirate fluids (e.g., seroma) that collect around tissue expanders following surgery.

SUMMARY OF THE INVENTION

In one embodiment, a method of removing (i.e., aspirating) fluid from the breast tissue of a patient that surrounds a tissue expander preferably includes identifying the location of an injection port of a tissue expander that is implanted in the breast tissue of a patient.

In one embodiment, the method preferably includes obtaining a needle, the needle including a needle shaft having a lumen extending between a proximal end and a distal end of the needle shaft. The needle preferably has a closed tip at the distal end of the needle shaft and at least one lateral opening formed in an outer wall of the needle shaft that is in fluid communication with the lumen.

In one embodiment, the method includes advancing the closed tip of the needle through the skin of the patient, the breast tissue of the patient, and the injection port until the closed tip of the needle contacts a needle guard of the injection port.

In one embodiment, the method includes visually confirming that the at least one lateral opening of the needle is not located outside of the skin of the patient to ensure that the at least one lateral opening of the needle is located inside the breast tissue of the patient where the fluid that has collected around the tissue expander may be accessed.

In one embodiment, the method includes aspirating fluid from the breast tissue of the patient via the at least one lateral opening of the needle.

In one embodiment, the injection port may include a central region including a septum, and a magnet secured to a base of the needle guard that is aligned with the septum.

In one embodiment, the method includes using a magnetic detector for identifying the location of the injection port of the tissue expander, and placing a mark on the skin of the patient to provide an external visual indicator of the location of the injection port of the tissue expander.

In one embodiment, the magnetic detector is adapted to detect the presence of the magnet that is secured to the base of the needle guard.

In one embodiment, aspirating fluid from the breast tissue may include connecting a distal end of a flexible tube with the proximal end of the needle shaft of the needle, connecting a syringe having a syringe plunger with a proximal end of the flexible tube for establishing fluid communication between the lumen of the needle and the syringe, and retracting the syringe plunger for drawing the fluid from the breast tissue and collecting the fluid in the syringe.

In one embodiment, the advancing the closed tip of the needle includes carefully pushing the needle through the skin, the breast tissue and injection port until the closed tip of the needle contacts the needle guard.

In one embodiment, the method may include massaging the patient's breast to move fluid (i.e., seroma) towards the needle, which may require for the patient to lie down.

In one embodiment, the syringe may have a size of 60 cc or greater.

In one embodiment, the at least one lateral opening formed in the outer wall of the needle shaft of the needle may be located between the closed tip of the needle and the proximal end of the needle shaft of the needle.

In one embodiment, the at least one lateral opening may include a first lateral opening that is located at a first distance from the closed tip of the needle, and a second lateral opening that is located at a second distance from the closed tip of the needle that is greater than the first distance.

In one embodiment, the first lateral opening may be located on a first side of the needle shaft and the second lateral opening may be located on a second side of the needle shaft that is opposite the first side of the needle shaft.

In one embodiment, the first and second lateral openings may include elongated slits having lengths that extend along a longitudinal axis of the needle shaft.

In one embodiment, a needle may have more than two lateral openings/slits. In one embodiment, a needle may have 3, 4, 5, or more lateral openings/slits.

In one embodiment, the needle is 16-20 gauge and more preferably an 18 gauge needle.

In one embodiment, the injection port preferably includes a septum that is located in a center of the injection port.

In one embodiment, when the closed tip of the needle is in contact with the needle guard, the first distance between the closed tip of the needle and the first lateral opening is greater than a distance between the needle guard and an exterior surface of the septum of the injection port.

In one embodiment, a method of removing and/or aspirating fluid from breast tissue surrounding a tissue expander preferably includes using a magnetic detector for identifying a location of an injection port of a tissue expander that is implanted in breast tissue of a patient, and placing a mark on the patient's skin to provide a visual indicator of the location of the injection port of the tissue expander.

In one embodiment, the method may include obtaining a needle having a shaft that surrounds a lumen extending between a proximal end and a distal end of the shaft, the needle including a closed tip at the distal end of the shaft and at least one lateral opening formed in an outer wall of the shaft that is in fluid communication with the lumen.

In one embodiment, the method includes inserting the closed tip of the needle into the mark placed on the skin of the patient, and advancing the closed tip of the needle through the skin of the patient, the breast tissue of the patient, and the injection port of the tissue expander until the closed tip of the needle contacts a needle guard of the injection port.

In one embodiment, the method includes visually confirming that the at least one lateral opening of the needle is not located outside of the skin of the patient for ensuring that the at least one lateral opening of the needle is located inside the breast tissue of the patient, and aspirating fluid from the breast tissue via the at least one lateral opening of the needle.

In one embodiment, the injection port may include a central region including a septum, and a magnet secured to a base of the needle guard that is aligned with the septum, whereby the magnetic detector is adapted to detect the presence of the magnet that is secured to the base of the needle guard.

In one embodiment, the tissue expander may include a shell having a shell opening that is closed by the injection port, and a biocompatible filler material disposed within the shell of the tissue expander.

In one embodiment, the shell may be made of biocompatible elastomers such as silicone.

In one embodiment, the biocompatible filler material may be silicone gel, foam, and/or saline.

In one embodiment, the at least one lateral opening formed in the outer wall of the shaft of the needle is preferably located between the closed tip of the needle and the proximal end of the shaft of the needle.

In one embodiment, the at least one lateral opening desirably includes a first lateral opening located at a first distance from the closed tip of the needle, and a second lateral opening located at a second distance from the closed tip of the needle that is greater than the first distance.

In one embodiment, the first lateral opening is located on a first lateral side of the shaft of the needle and the second lateral opening is located on a second lateral side of the shaft of the needle that is opposite the first lateral side of the needle.

In one embodiment, the first and second lateral openings desirably include elongated slits having lengths that extend along a longitudinal axis of the shaft of the needle.

In one embodiment, the injection port may include a septum that is located in a center of the injection port.

In one embodiment, when the closed tip of the needle is in contact with the needle guard, the first distance between the closed tip of the needle and the first lateral opening of the needle is preferably greater than a distance between the needle guard and an exterior surface of the septum of the injection port.

In one embodiment, the method of removing and/or aspirating fluid from breast tissue that surrounds a tissue expander desirably includes using a magnetic detector for identifying a location of an injection port of a tissue expander that is implanted in a breast pocket formed in breast tissue of a patient.

In one embodiment, the injection port includes a magnet detectable by the magnetic detector.

In one embodiment, the method includes marking skin of the patient to provide an external visual indicator on the skin of the location of the injection port of the tissue expander.

In one embodiment, the method includes obtaining a needle having a shaft that surrounds a lumen, the lumen extending between a proximal end and a distal end of the shaft, the needle including a closed tip at the distal end of the shaft and at least one lateral opening formed in an outer wall of the shaft that is in fluid communication with the lumen.

In one embodiment, the method includes advancing the closed tip of the needle through the external visual indicator, the skin, the breast tissue and the injection port until the closed tip of the needle contacts a needle guard of the injection port.

In one embodiment, the method includes visually confirming that the at least one lateral opening of the needle is not located outside the skin of the patient for ensuring that the at least one lateral opening of the needle is located inside the breast tissue of the patient.

In one embodiment, the method includes aspirating fluid from the breast tissue of the patient that surrounds the tissue expander via the at least one lateral opening of the needle.

In one embodiment, aspirating fluid from the breast tissue of the patient step may include connecting a distal end of a flexible tube with the proximal end of the shaft of the needle, connecting a syringe having a syringe plunger with a proximal end of the flexible tube for establishing fluid communication between the lumen of the needle and the syringe, and retracting the syringe plunger for drawing the fluid from the breast tissue of the patient and collecting the fluid within the syringe.

In one embodiment, luer locks may be used for coupling the syringe with the flexible tube and/or the needle.

In one embodiment, a needle for aspirating fluid from breast tissue may include an elongated shaft having a proximal end and a distal end, a lumen extending between the proximal and distal ends of the elongated shaft, a closed tip located at the distal end of the elongated shaft, and at least one lateral opening formed in an outer wall of the elongated shaft that is in fluid communication with the lumen.

In one embodiment, the at least one lateral opening of the needle may include a first lateral opening that is located at a first distance from the closed tip of the needle, and a second lateral opening that is located at a second distance from the closed tip of the needle that is greater than the first distance.

In one embodiment, the first lateral opening is located on a first lateral side of the elongated shaft and the second lateral opening is located on a second lateral side of the elongated shaft that is opposite the first lateral side of the elongated shaft.

In one embodiment, the first and second lateral openings include elongated slits having lengths that extend along a longitudinal axis of the elongated shaft.

In one embodiment, the needle is a butterfly needle and/or has butterfly connectors.

In one embodiment, a needle preferably has butterfly connectors, a closed distal tip and one or more side slits that are located at a predetermined distance from the closed distal tip to ensure that the one or more side slits are located outside of the injection port of the tissue expander but within the breast tissue of the patient where the fluid can be accessed.

These and other preferred embodiments of the present patent application will be described in more detail herein.

DETAILED DESCRIPTION OF PREFERRED EMBODIMENTS

Figure 1:
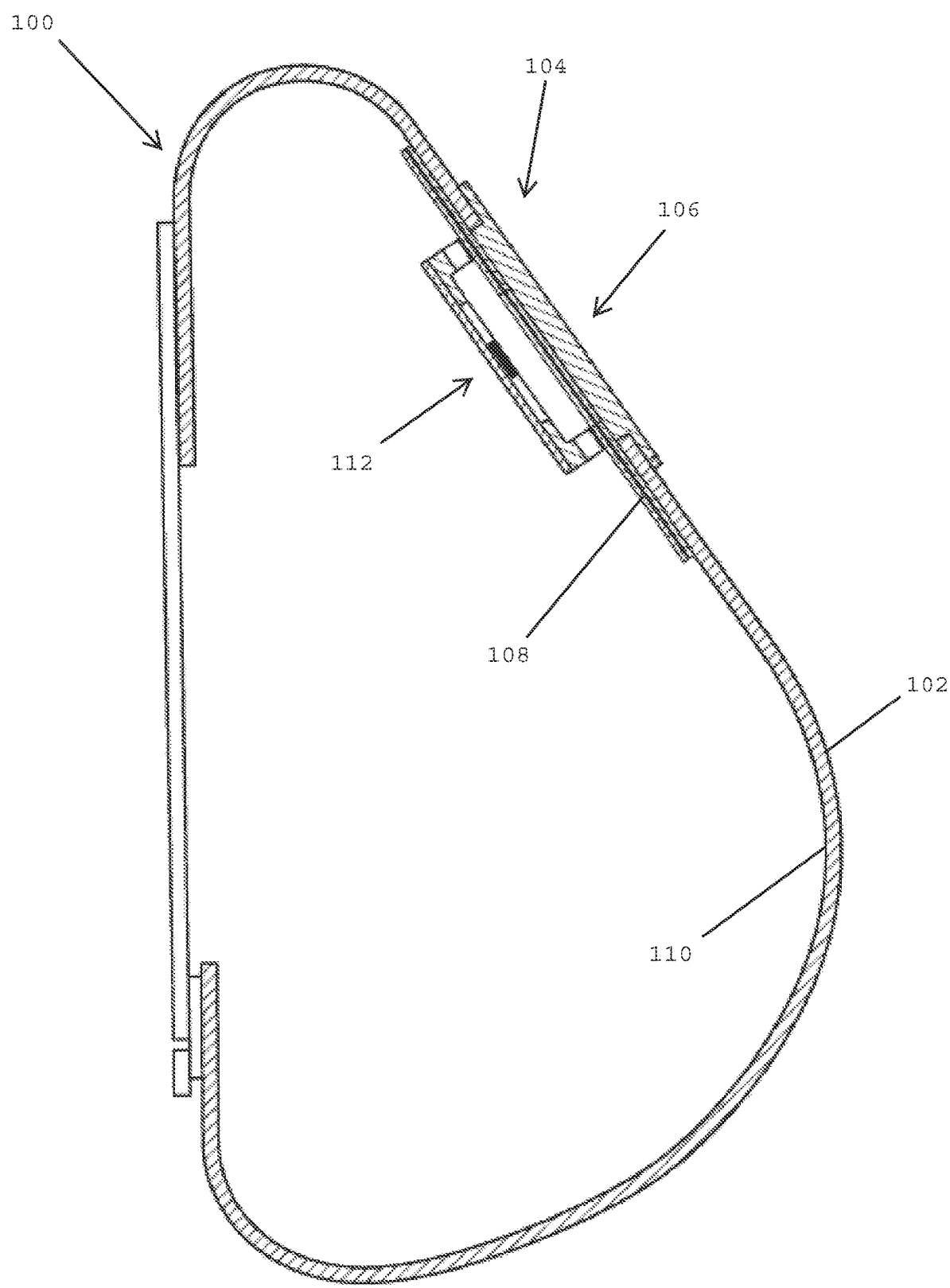
FIG. 1 is a cross-sectional view of a tissue expander having an injection port for filling the tissue expander, in accordance with one embodiment of the present patent application.

Referring to FIG. 1, in one embodiment, a tissue expander 100 may be used for breast reconstruction. In one embodiment, the tissue expander 100 may be implanted in a breast pocket formed in breast tissue of a patient.

In one embodiment, the tissue expander 100 preferably includes an outer shell 102, which may be made of a biocompatible elastomer such as silicone. In one embodiment, the outer shell 102 may include an injection port opening 104 that is filled by an injection port 106. The injection port 106 may be utilized for adding fluid to the inside of the outer shell 102 for expanding the size of the outer shell. In one embodiment, the tissue expander 100 preferably includes a self-sealing safety patch 108 that is secured to an inner surface 110 of the outer shell and that surrounds the outer perimeter of the injection port 106 as disclosed in U.S. Pat. No. 11,191,635, assigned to Mentor Worldwide LLC of Irvine, California, the disclosure of which is hereby incorporated by reference herein.

In one embodiment, the injection port 106 preferably includes a magnet 112 that enables surgical personnel to identify the location of the injection port after the tissue expander 100 has been implanted within a breast pocket formed in breast tissue of a patient.

Figure 2:
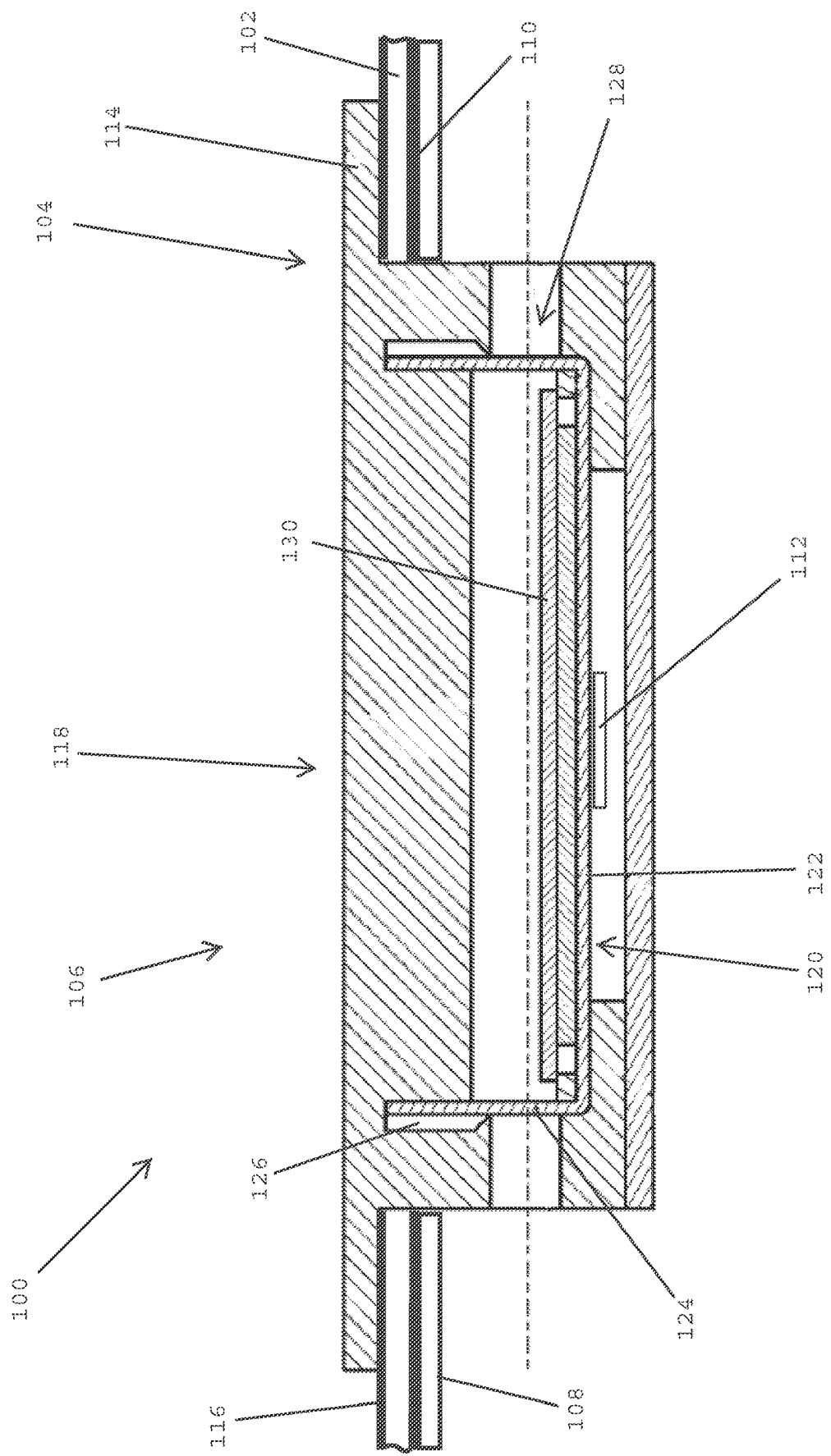
FIG. 2 is a magnified, cross-sectional view of the injection port shown in FIG. 1.

Referring to FIG. 2, in one embodiment, the injection port 106 is preferably inserted into the injection port opening 104 of the outer shell 102 of the tissue expander 100. The injection port 106 preferably includes an outer flange 114 that extends around an outer perimeter of the injection port 106. In one embodiment, the outer flange 114 is preferably secured to an outer surface 116 of the outer shell 102. The self-sealing safety patch 108 is preferably secured to the inner surface 110 of the outer shell 102. The self-sealing safety patch 108 preferably extends around the outer perimeter of the injection port 106 including the outer perimeter of the outer flange 114 of the injection port.

The injection port 106 allows for the controlled introduction and removal of fluid (e.g., saline) to and from the tissue expander 100. Generally, this may be accomplished through the use of a hypodermic needle (not shown) that pierces a septum 118 of the injection port 106. The septum 118 may be formed of elastomeric material. In one embodiment, the injection port 106 is fitted into the injection port opening 104 in the outer shell 102, which is the region of the outer shell 102 that is intended to face the skin of the patient into which the tissue expanded will be implanted.

In one embodiment, the septum region 118 of the injection port 106 is self-sealing for preventing fluid from leaking from the tissue expander 100 after the hypodermic needle has been removed from the injection port 106. The outer flange 114 extends around the outer perimeter of the injection port. The outer flange 114 preferably extends over a section of the outer shell 102 that is sandwiched between the outer flange 114 and the self-sealing safety patch 108.

In order to prevent accidental puncture of the shell 102 through the injection port 106 itself, the injection port 106 is equipped with a needle guard 120 (e.g., a metal cup). In one embodiment, the needle guard 120 includes a base 122 and a rim 124 that extends upwardly from the base. In one embodiment, the rim 124 may be fitted into an annular slot 126 formed in an underside of the injection port 106. When the needle guard 120 is inserted into the annular slot 126 of the injection port 106, compressive force is exerted on the elastomeric material of the septum region 118 of the injection port 106, which ensures that the septum 118 of the injection port 106 is self-sealing. The rim 124 of the needle guard 120 preferably has openings 128 that are configured for allowing fluid to pass through the openings for filling the interior of the outer shell 102 of the tissue expander 100.

In one embodiment, the injection port 106 preferably includes a needle damper 130, formed of a resilient material (e.g., polysulfone) that is positioned over a top surface of the base 122 of the needle guard 120 to prevent damage to the hypodermic needle tip should the needle be inserted as far as to accidentally strike the needle guard. It is prudent to reduce the risk of damage to the hypodermic needle because a bent needle tip could tear a non-repairable hole that compromises the self-sealing capability of the septum 118 upon withdrawal of the needle from the injection port 106. In one embodiment, the needle damper 130 is adhesively fastened to the top surface of the base 122 of the needle guard 120.

In one embodiment, the injection port 106 preferably includes the magnet 112 that is attached to an underside of the base 122 of the needle guard 120. The magnet 112 generates a magnetic field that may be detected by a magnetic detector, which, in turn, enables medical personnel to use a magnetic detector to identify the exact location of the injection port 106.

The outer shell 102 of the tissue expander 100 may have any desired shape and any thickness that is suitable for the purpose of the particular expander. The outer shell 102 may be single lumen or multi-lumen and may be formed of a biocompatible elastomer, e.g., silicone. The outer shell may be formed using an appropriately sized and shaped mandrel as part of a dip molding process. In one embodiment, the mandrel is dipped into silicone dispersion and then removed to allow partial cure or solvent evaporation. The process may be repeated several times once the outer shell 102 has been formed. Other methods such as injection molding or spraying may also be used to form the shell.

The dip molding process typically results in the formation of a partial shell that has an opening, e.g., a circular hole on its face. The self-sealing safety patch 108 is applied to the inner surface 110 of the outer shell 102 in the region that will surround the injection port 106. The injection port 106 is installed and seals the injection port opening formed in the shell, thus forming a complete fluid impervious shell. The injection port 106 and the self-sealing safety patch 108 may be attached to the respective surfaces of the outer shell 102 using silicone, rubber, or other similar biocompatible adhesives. Once fully formed, the outer shell 102 may remain empty (i.e., non-filled) or be partially pre-filled. After implantation, the tissue expander 100 is intraoperatively filled through the septum 118 of the injection port 106 using biocompatible fluids (e.g., saline, gel, foam, and/or or combinations of these materials) to gradually expand the tissue expander 100 to the desired dimensions.

Figure 3:
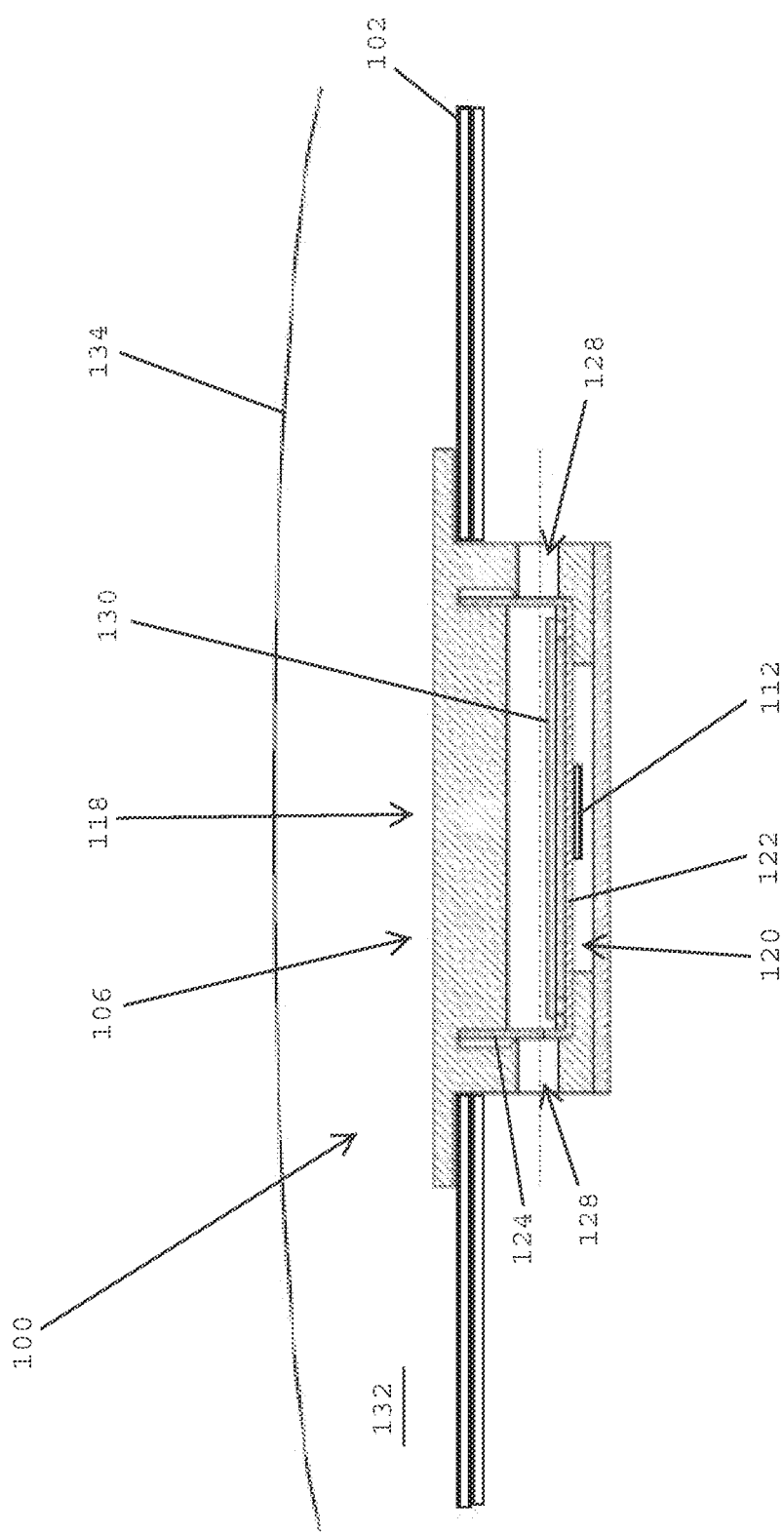
FIG. 3 illustrates a portion of the tissue expander of FIG. 1 after the tissue expander has been implanted within a breast pocket formed in breast tissue, in accordance with one embodiment of the present patent application.

Referring to FIG. 3, in one embodiment, the tissue expander 100 having the outer shell 102 and the injection port 106 may be implanted within a breast pocket formed in breast tissue 132 of a patient. The breast tissue 132 is covered by skin 134. The tissue expander 100 is preferably oriented so that the injection port 106 faces toward the skin 134 of the patient. A magnetic detector (not shown) may be utilized for detecting the magnetic field generated by the magnet 112 for enabling medical personnel to locate septum 118 of the injection port 106.

After the tissue expander 100 has been implanted within the patient's breast tissue 132, a hypodermic needle may be passed through the septum 118 of the injection port 106 until the tip of the hypodermic needle abuts against the needle damper 130 that overlies the base 122 of the needle guard 120. The fluid dispensed from the hypodermic needle preferably passes through the openings 128 of the rim 124 of the needle guard 120 for filling the outer shell 102 of the tissue expander 100.

Figure 4:
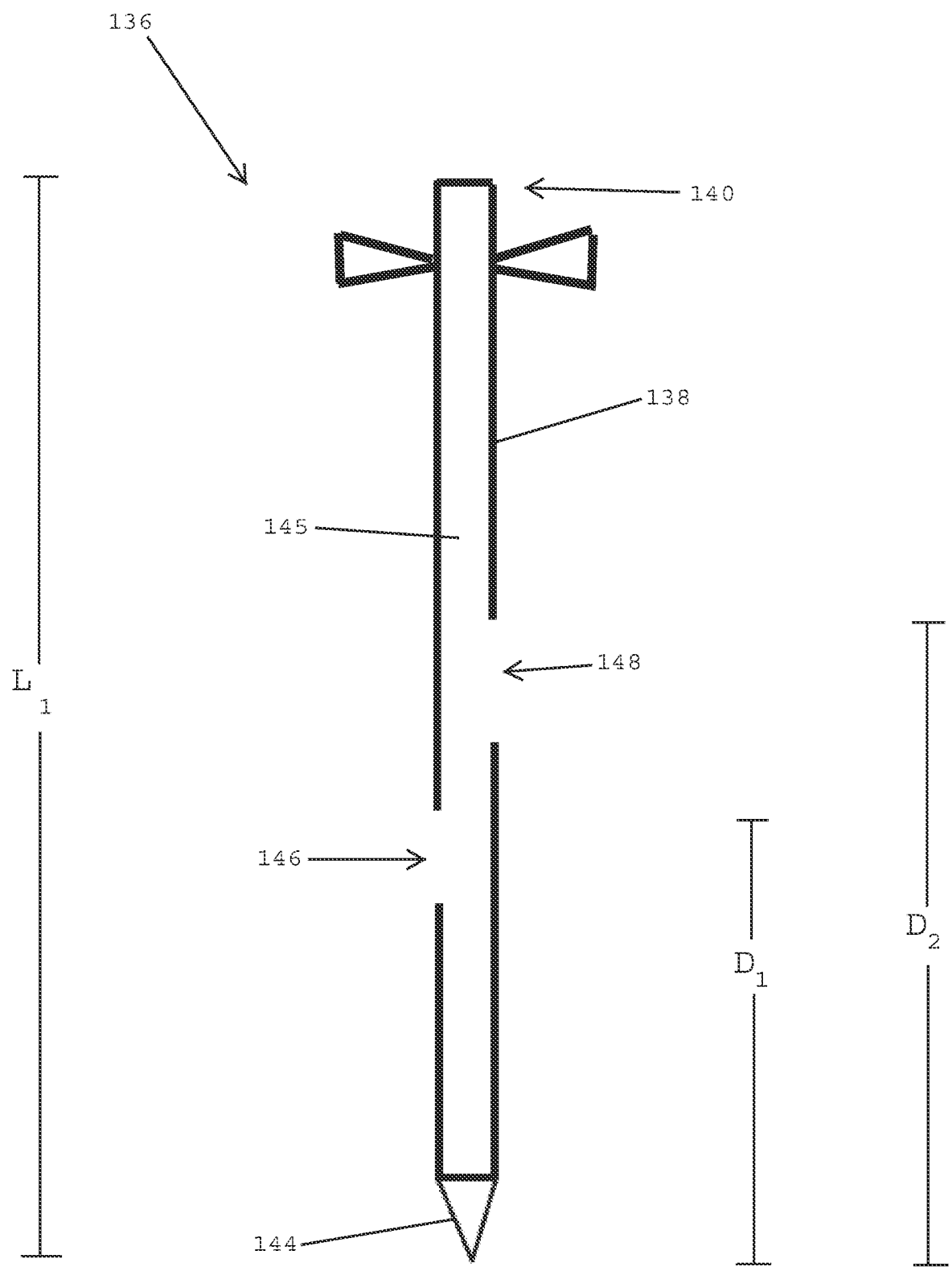
FIG. 4 is a cross-sectional view of a needle that is inserted into the injection port of the tissue expander shown in FIG. 3 for aspirating fluid that accumulates in the breast pocket that surrounds the tissue expander, in accordance with one embodiment of the present patent application.

Referring to FIG. 4, in one embodiment, a needle 136 may be utilized to aspirate (i.e., drain) fluid that accumulates in a breast pocket that surrounds an implanted tissue expander. In one embodiment, the needle 136 preferably has an elongated, hollow shaft 138 including a proximal end 140 and a distal end 142 having a closed tip 144. The hollow shaft 138 preferably surrounds a lumen 145 that extends between the proximal end 140 and the distal end of the needle. In one embodiment, the drainage needle 136 preferably includes a first lateral slit 146 that is located between the closed tip 144 and the proximal end 140 of the elongated shaft 138. In one embodiment, the drainage needle 136 includes a second lateral slit 148 that is located between the first lateral slit 146 and the proximal end 140 of the elongated shaft 138. The first and second lateral slits 146, 148 are preferably in fluid communication with the lumen 145 that extends along the length of the needle 136.

In one embodiment, the needle 136 has a length Li that extends from the closed tip 144 to the proximal end 140 of the elongated shaft 138. In one embodiment, the first lateral slit 146 is spaced away from the closed tip 144 by a first distance $D_1$. The second lateral slit 148 is spaced away from the closed tip 144 by a second distance $D_2$ that is greater than the first distance $D_1$ of the first lateral slit 146.

Although the needle 136 is FIG. 4 has two lateral slits 146, 148, in other embodiments, a needle used to aspirate fluid from breast tissue may have more than two lateral slits or openings. For example, a needle may have 3, 4, 5 or more lateral slits/openings.

Figure 5:
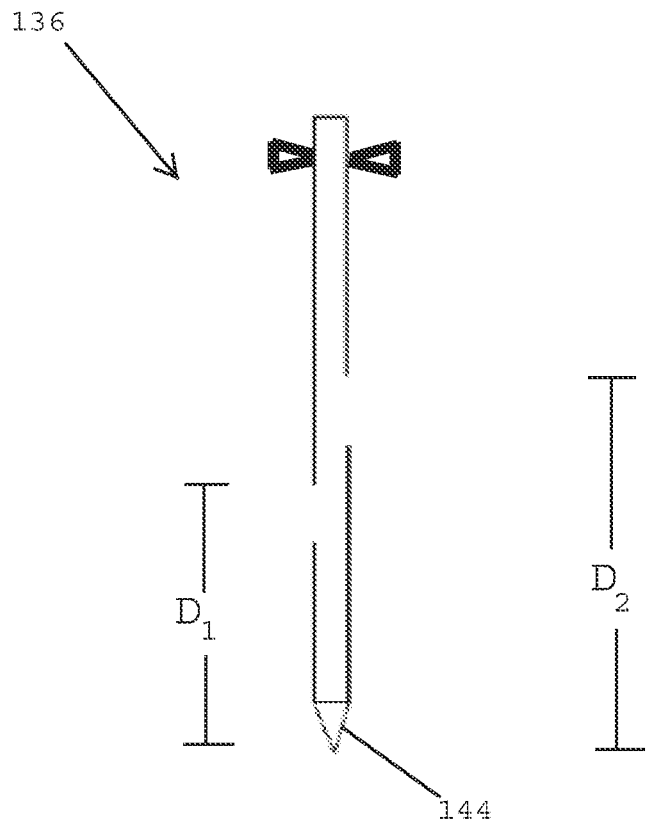
FIG. 5 shows a stage of a method of aspirating fluid that accumulates in a breast pocket that surrounds a tissue expander, in accordance with one embodiment of the present patent application.
Figure 5:
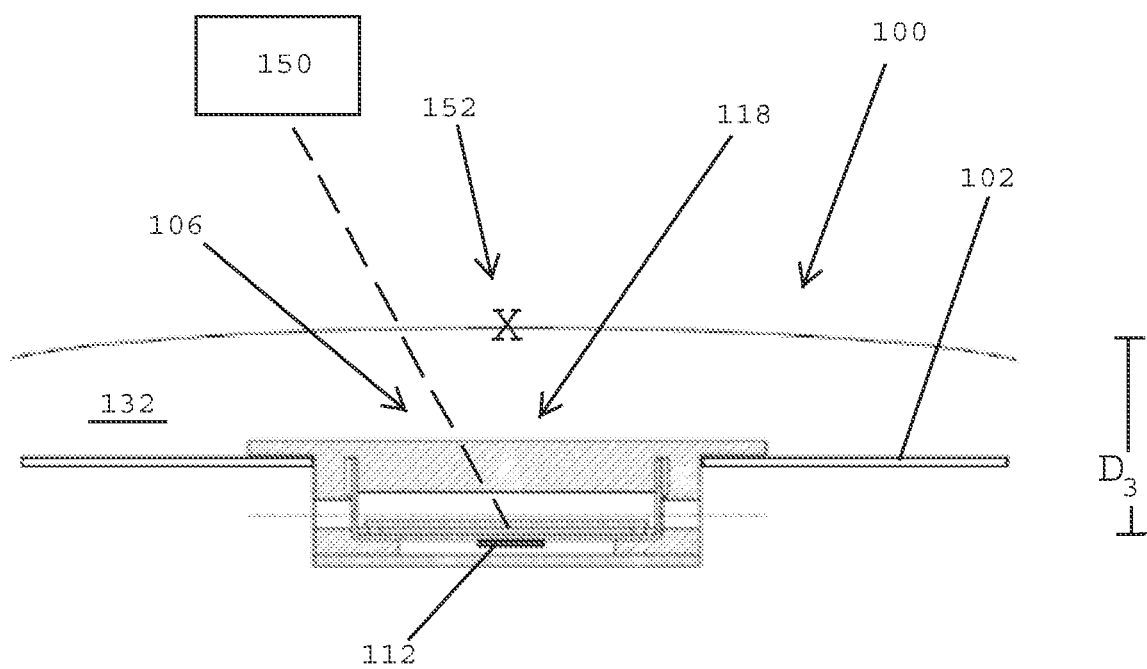

Referring to FIG. 5, in one embodiment, the drainage needle 136 may be utilized to aspirate or drain fluid (e.g., seroma) that has accumulated within the breast pocket of the breast tissue 132 that surrounds the tissue expander. In one embodiment, the tissue expander 100 is implanted within the patient so that the injection port 106 of the tissue expander 100 faces the skin 134 of the patient. In one embodiment, a magnetic detector 150 may be utilized for detecting the magnetic field generated by the magnet 112 of the injection port 106. Using the magnetic detector 150 will preferably enable medical personnel to identify the exact location of the septum 118 of the injection port 106 to ensure that the closed tip 144 of the drainage needle 136 is inserted into the septum 118 and not outside the outer periphery of the injection port 106, which could result in a puncture of the outer shell 102 of the tissue expander 100.

After the magnetic detector 150 has been utilized for detecting the presence of the magnet 112 and the septum 118 of the injection port 106, medical personnel may place a visual indicator 152 (e.g., a mark) on the skin 134 of the patient. The mark 152 preferably aligns with the septum 118 of the injection port 106 so that the closed tip 144 of the drainage needle 136 may be properly aligned with the septum 118 of the injection port 106 of the tissue expander 100.

Figure 6:
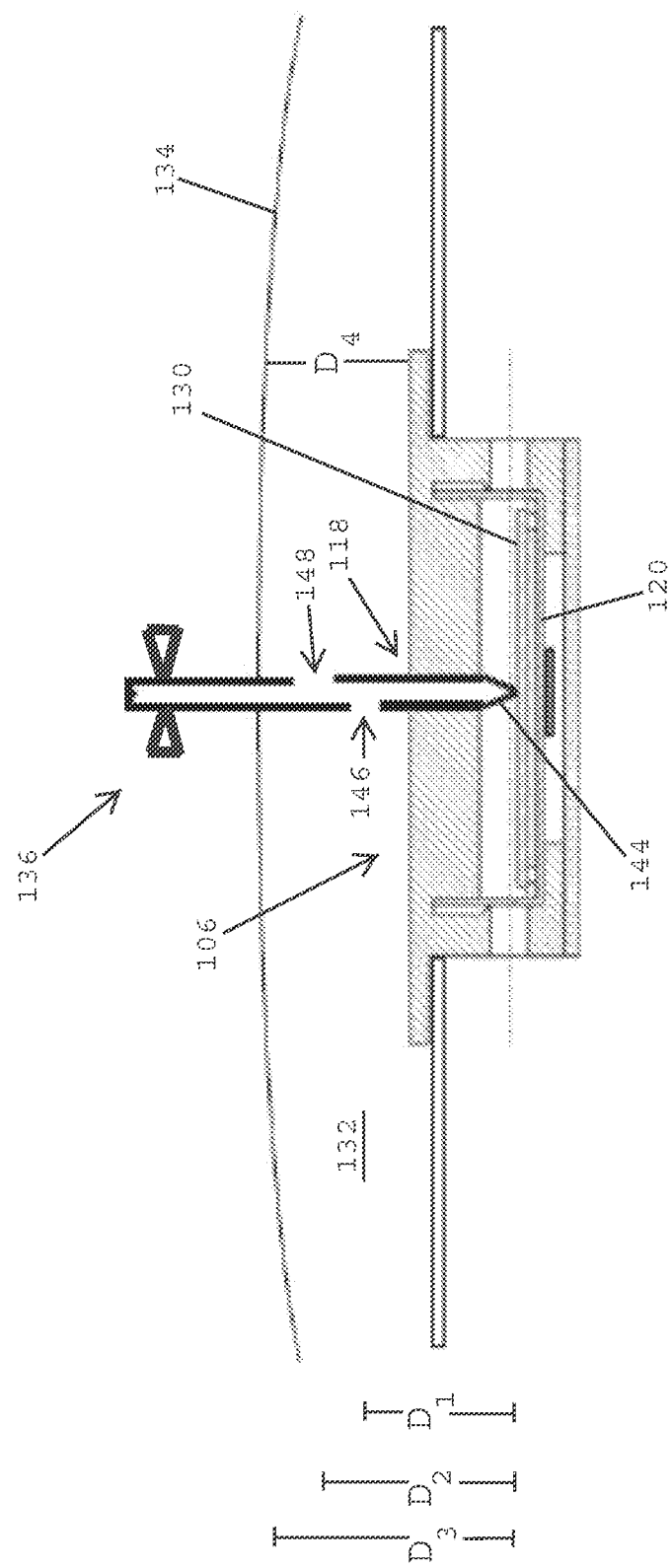
FIG. 6 shows another stage of a method of aspirating fluid that accumulates in a breast pocket that surrounds a tissue expander, in accordance with one embodiment of the present patent application.

Referring to FIG. 6, in one embodiment, the closed tip 144 is preferably passed through the skin 134 and the breast tissue 132 of the patient. The tip 144 of the drainage needle 136 is further advanced through the septum 118 of the injection port 106 until the closed tip 144 abuts against the needle damper 130 overlying the needle guard 120. After the closed tip 144 of the drainage needle 136 has been advanced until it abuts against the needle damper 130 of the needle guard 120, the first and second lateral slits 146, 148 of the drainage needle 136 are preferably positioned outside the septum 118 and within the breast tissue 132 of the patient. The distance between the skin 134 and the needle guard 120 is designated $D_3$, which is greater than the first and second distances $D_1$, $D_2$ for the respective first and second lateral slits 146, 148. In one embodiment, medical personnel will visually confirm that at least one of the first and second lateral slits 146, 148 are not visible outside the patient's skin 134, which ensures that at least one of the lateral slits will be located within the breast tissue 132 for draining fluid.

Figure 7:
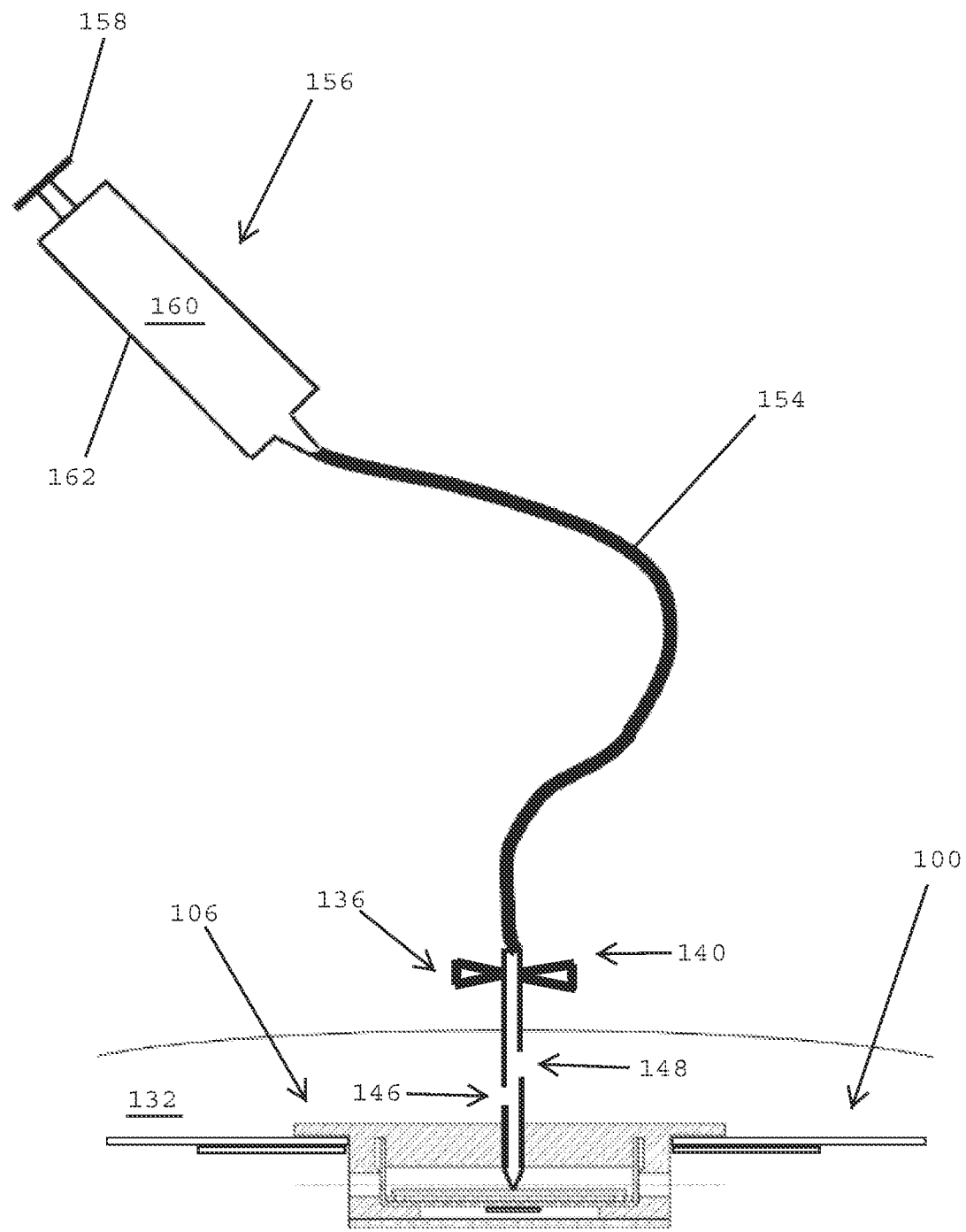
FIG. 7 shows yet another stage of a method of aspirating fluid that accumulates in a breast pocket that surrounds a tissue expander, in accordance with one embodiment of the present patent application.

Referring to FIG. 7, in one embodiment, after the closed tip 144 of the drainage needle 136 has been fully inserted into the injection port 106 of the tissue expander 100, the first and second lateral slits 146, 148 may be utilized for draining the fluid that has accumulated within the breast pocket of the breast tissue 132 of the patient. In one embodiment, the fluid may be drained from the breast tissue 132 by attaching a distal end of a flexible tube 154 to the proximal end 140 of the drainage needle 136. A syringe 156 may be secured to a proximal end of the flexible tube 154. In one embodiment, the syringe 156 has a plunger 158 that may be retracted in the direction DIR1 for creating a vacuum for aspirating the accumulated fluid from the breast tissue 132 of the patient. In one embodiment, as the plunger 158 is retracted in the direction DIR1, the vacuum that is generated by the syringe 156 draws the fluid that has accumulated around the tissue expander through the first and second lateral slits 146, 148 of the needle 136. The fluid continues to be drawn from the proximal end 140 of the needle 136 and into the flexible tube 154. The fluid continues to travel toward the syringe 156 for filling a fluid chamber 160 of a syringe barrel 162 of the syringe 156.

Figure 8:
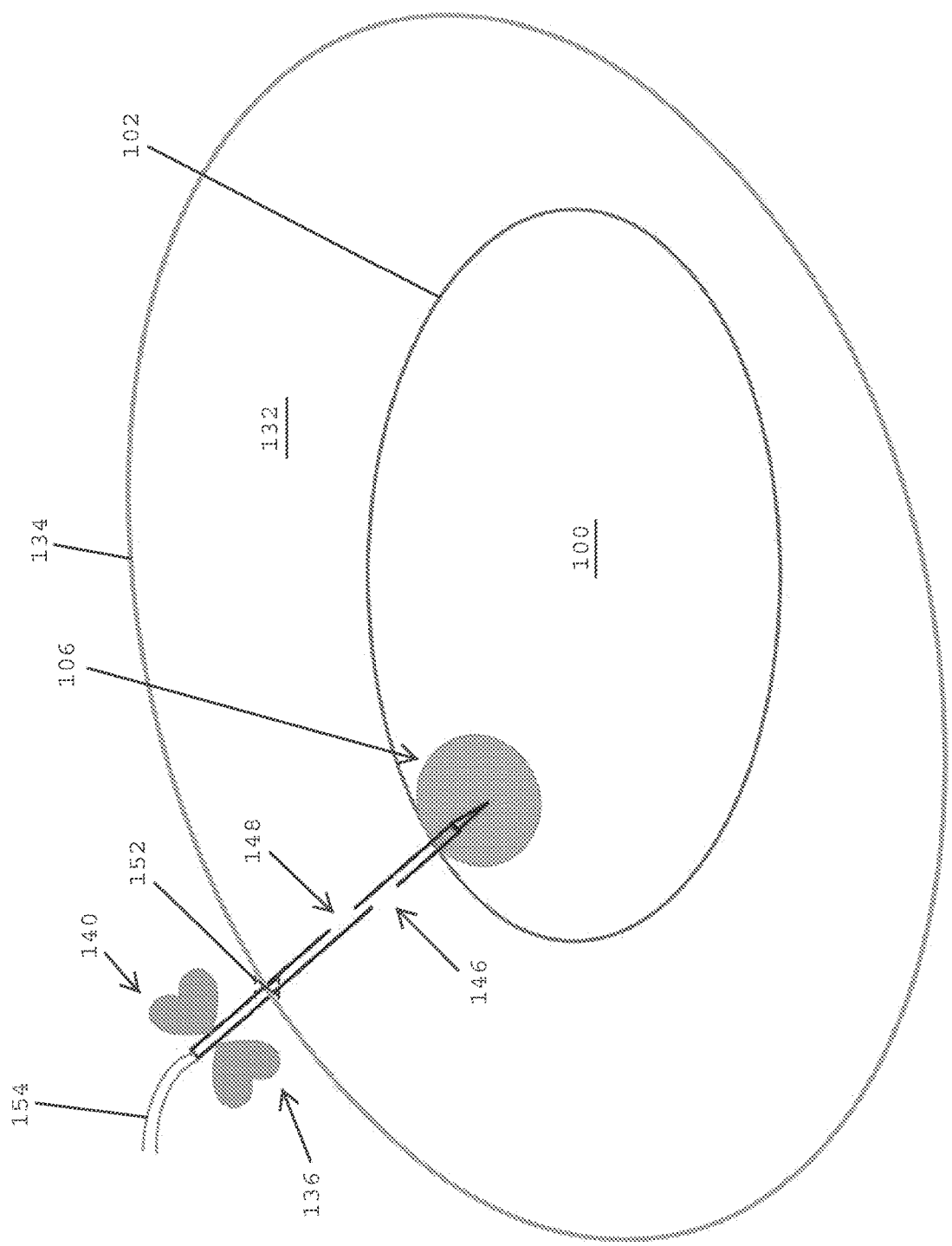
FIG. 8 is a schematic view of a system for draining fluid that accumulates in a breast pocket that surrounds a tissue expander during breast reconstruction, in accordance with one embodiment of the present patent application.

Referring to FIG. 8, in one embodiment, the tissue expander 100 includes the injection port 106 that closes an injection port opening of the shell 102 of the tissue expander 100. The tissue expander is preferably implanted in a breast pocket that is formed in breast tissue 132 of a patient. The injection port 106 preferably faces toward the skin 134 of the patient. In one embodiment, a magnetic detector is utilized for identifying the location of the injection port 106 of the tissue expander 100. A mark 152 (e.g., a pen mark) may be made on the skin 134 of the patient for identifying the location of the injection port 106. The closed tip 144 of the drainage needle 136 is preferably passed through the mark 152, the skin 134, and the breast tissue 132 and advanced into the injection port 106 of the tissue expander 100 until the closed tip 144 bottoms out on the base of the needle guard 120 (FIG. 6) of the injection port 106.

In one embodiment, after the closed tip 144 has been abutted against the base of the needle guard, the first and second lateral slits 146, 148 are desirably positioned outside the septum of the injection port 106 and within the breast tissue 132 of the patient. The flexible tube 154 may connected with the proximal end 140 of the drainage needle 136 for draining the fluid (e.g., seroma) that has accumulated within the breast pocket that surrounds the tissue expander.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of removing fluid from breast tissue surrounding a tissue expander comprising:
   identifying a location of an injection port of a tissue expander that is implanted in breast tissue of a patient;
   obtaining a needle including a needle shaft having a lumen extending between a proximal end and a distal end of the needle shaft, the needle including a closed tip at the distal end of the needle shaft and at least one lateral opening formed in an outer wall of the needle shaft that is in fluid communication with the lumen;
   advancing the closed tip of the needle through skin of the patient, the breast tissue of the patient, and the injection port until the closed tip of the needle contacts a needle guard of the injection port;
   visually confirming that the at least one lateral opening of the needle is not located outside of the skin of the patient to ensure that the at least one lateral opening of the needle is located inside the breast tissue of the patient;
   aspirating fluid from the breast tissue of the patient via the at least one lateral opening of the needle.

2. The method as claimed in claim 1, further comprising:
   using a magnetic detector for identifying the location of the injection port of the tissue expander; and
   placing a mark on the skin of the patient to provide an external visual indicator of the location of the injection port of the tissue expander.

3. The method as claimed in claim 1, wherein the aspirating fluid from the breast tissue step comprises:
   connecting a distal end of a flexible tube with the proximal end of the needle shaft of the needle;
   connecting a syringe having a syringe plunger with a proximal end of the flexible tube for establishing fluid communication between the lumen of the needle and the syringe;
   retracting the syringe plunger for drawing the fluid from the breast tissue and collecting the fluid in the syringe.

4. The method as claimed in claim 3, wherein the syringe is size 60cc or greater.

5. The method as claimed in claim 1, wherein the at least one lateral opening formed in the outer wall of the needle shaft of the needle is located between the closed tip of the needle and the proximal end of the needle shaft of the needle.

6. The method as claimed in claim 5, wherein the at least one lateral opening comprises:
   a first lateral opening that is located at a first distance from the closed tip of the needle;
   a second lateral opening that is located at a second distance from the closed tip of the needle that is greater than the first distance.

7. The method as claimed in claim 6, wherein the first lateral opening is located on a first side of the needle shaft and the second lateral opening is located on a second side of the needle shaft that is opposite the first side of the needle shaft.

8. The method as claimed in claim 6, wherein the first and second lateral openings comprise elongated slits having lengths that extend along a longitudinal axis of the needle shaft.

9. The method as claimed in claim 1, wherein the needle is an 18 gauge needle.

10. The method as claimed in claim 6, wherein the injection port includes a septum that is located in a center of the injection port, and wherein when the closed tip of the needle is in contact with the needle guard the first distance between the closed tip of the needle and the first lateral opening is greater than a distance between the needle guard and an exterior surface of the septum of the injection port.

11. A method of removing fluid from a breast tissue surrounding a tissue expander comprising:
   using a magnetic detector for identifying a location of an injection port of a tissue expander that is implanted in breast tissue of a patient;
   placing a mark on the patient's skin to provide a visual indicator of the location of the injection port of the tissue expander;
   obtaining a needle having a shaft that surrounds a lumen extending between a proximal end and a distal end of the shaft, the needle including a closed tip at the distal end of the shaft and at least one lateral opening formed in an outer wall of the shaft that is in fluid communication with the lumen;
   inserting the closed tip of the needle into the mark placed on the skin of the patient;
   advancing the closed tip of the needle through the skin of the patient, the breast tissue of the patient, and the injection port of the tissue expander until the closed tip of the needle contacts a needle guard of the injection port;
   visually confirming that the at least one lateral opening of the needle is not located outside of the skin of the patient for ensuring that the at least one lateral opening of the needle is located inside the breast tissue of the patient;
   aspirating fluid from the breast tissue via the at least one lateral opening of the needle.

12. The method as claimed in claim 11, wherein the injection port further comprises:
   a central region including a septum;
   a magnet secured to a base of the needle guard that is aligned with the septum, wherein the magnetic detector is adapted to detect the presence of the magnet that is secured to the base of the needle guard.

13. The method as claimed in claim 11, wherein said tissue expander comprises:
   a shell having a shell opening that is closed by the injection port;
   a biocompatible filler material disposed within the shell of the tissue expander.

14. The method as claimed in claim 13, wherein the shell is made of materials selected from the group consisting of biocompatible elastomers and silicone, and the biocompatible filler material is selected from the group consisting of silicone gel, foam, and saline.

15. The method as claimed in claim 11, wherein the at least one lateral opening formed in the outer wall of the shaft of the needle is located between the closed tip of the needle and the proximal end of the shaft of the needle.

16. The method as claimed in claim 15, wherein the at least one lateral opening comprises:
   a first lateral opening located at a first distance from the closed tip of the needle;
   a second lateral opening located at a second distance from the closed tip of the needle that is greater than the first distance.

17. The method as claimed in claim 16, wherein the first lateral opening is located on a first lateral side of the shaft of the needle and the second lateral opening is located on a second lateral side of the shaft of the needle that is opposite the first lateral side of the needle, and wherein the first and second lateral openings comprise elongated slits having lengths that extend along a longitudinal axis of the shaft of the needle.

18. The method as claimed in claim 15, wherein the injection port includes a septum that is located in a center of the injection port, and wherein when the closed tip of the needle is in contact with the needle guard, the first distance between the closed tip of the needle and the first lateral opening of the needle is greater than a distance between the needle guard and an exterior surface of the septum of the injection port.

19. A method of removing fluid from breast tissue that surrounds a tissue expander comprising:
   using a magnetic detector for identifying a location of an injection port of a tissue expander that is implanted in a breast pocket formed in breast tissue of a patient, the injection port including a magnet detectable by the magnetic detector;
   marking skin of the patient to provide an external visual indicator on the skin of the location of the injection port of the tissue expander;
   obtaining a needle having a shaft that surrounds a lumen, the lumen extending between a proximal end and a distal end of the shaft, the needle including a closed tip at the distal end of the shaft and at least one lateral opening formed in an outer wall of the shaft that is in fluid communication with the lumen;
   advancing the closed tip of the needle through the external visual indicator, the skin, the breast tissue and the injection port until the closed tip of the needle contacts a needle guard of the injection port;
   visually confirming that the at least one lateral opening of the needle is not located outside the skin of the patient for ensuring that the at least one lateral opening of the needle is located inside the breast tissue of the patient;
   aspirating fluid from the breast tissue of the patient that surrounds the tissue expander via the at least one lateral opening of the needle.

20. The method as claimed in claim 19, wherein the aspirating fluid from the breast tissue of the patient step comprises:

connecting a distal end of a flexible tube with the proximal end of the shaft of the needle;
connecting a syringe having a syringe plunger with a proximal end of the flexible tube for establishing fluid communication between the lumen of the needle and the syringe;
retracting the syringe plunger for drawing the fluid from the breast tissue of the patient and collecting the fluid within the syringe.

* * * * *